United States Patent [19]
Schoenhofer

[11] Patent Number: 5,566,628
[45] Date of Patent: Oct. 22, 1996

[54] GROUND CLOSER KIT FOR ATTACHMENT TO A SEEDING/FERTILIZING APPARATUS AND A SEEDING/FERTILIZING APPARATUS HAVING A GROUND CLOSER PLATE

[76] Inventor: Walter Schoenhofer, R.R. #5, Wetaskiwin, Alberta, Canada, T9A 1X2

[21] Appl. No.: 513,129

[22] Filed: Aug. 9, 1995

[51] Int. Cl.⁶ .................................. A01C 5/00
[52] U.S. Cl. ............... 111/198; 111/69; 111/84; 111/148; 111/156
[58] Field of Search ................ 111/197, 120, 111/69, 148, 198, 190, 926, 119, 123, 124, 125, 126, 149, 152, 153, 154, 156

[56] References Cited

U.S. PATENT DOCUMENTS

| | | | |
|---|---|---|---|
| 211,225 | 1/1879 | Cloyd | 111/154 |
| 562,755 | 6/1896 | Banwarth | 111/198 X |
| 1,841,236 | 1/1932 | Zaback | 111/198 |
| 2,869,489 | 1/1959 | Buhr | 111/198 X |
| 3,046,917 | 7/1962 | Kasper | 111/69 |
| 3,157,139 | 11/1964 | Spindler | 111/190 X |
| 3,621,800 | 11/1971 | Rellinger | 111/190 X |
| 3,774,557 | 11/1973 | Esmay et al. | 111/198 X |
| 4,596,199 | 6/1986 | Dietrich, Sr. et al. | 111/123 |
| 4,721,048 | 1/1988 | Fuss et al. | 111/926 X |

FOREIGN PATENT DOCUMENTS

| | | | |
|---|---|---|---|
| 352865 | 1/1990 | European Pat. Off. | 111/926 |
| 300979 | 3/1917 | Germany | 111/198 |
| 3217428 | 7/1983 | Germany | 111/926 |
| 1426488 | 9/1988 | U.S.S.R. | 111/124 |
| 2144012 | 2/1985 | United Kingdom | 111/926 |

*Primary Examiner*—Terry Lee Melius
*Assistant Examiner*—Christopher J. Novosad
*Attorney, Agent, or Firm*—Anthony R. Lambert

[57] ABSTRACT

A ground closer kit for attachment to a seeding/fertilizing apparatus includes a support frame having a first end, a second end, and a bottom edge. The first end is adapted for pivotally mounting the support frame to a ground opener. A ground closer plate is secured to the bottom edge of the support frame at the second end. A rod is pivotally mounted to the second end of the support frame. A receptacle is provided for attachment to a seed/fertilizer delivery tube. The rod is securable within the receptacle at one of a plurality of attachment positions along the length of the rod.

5 Claims, 3 Drawing Sheets

5,566,628

GROUND CLOSER KIT FOR ATTACHMENT TO A SEEDING/FERTILIZING APPARATUS AND A SEEDING/FERTILIZING APPARATUS HAVING A GROUND CLOSER PLATE

FIELD OF THE INVENTION

The present invention relates to a ground closer kit for attachment to a seeding/fertilizing apparatus, and a seeding/fertilizing apparatus modified with the ground closer kit to have a ground closer plate

BACKGROUND OF THE INVENTION

In Canadian Patent Application 2,130,594 published Feb. 2, 1996 Walter Schoenhofer disclosed a seeding/fertilizing apparatus that included a ground opener with a seeding/fertilizing conduit positioned along a trailing edge of the ground opener. The sole means of packing after seeding, as taught in the Schoenhofer reference, was by means of a ground closer plate. In addition to the ground closer plate, Schoenhofer taught that for best results a subsurface chain should be attached to ground closer plate.

SUMMARY OF THE INVENTION

What is required is ground closer kit for attachment to a seeding/fertilizing apparatus.

According to one aspect of the present invention there is provided a ground closer kit for attachment to a seeding/fertilizing apparatus which includes a support frame having a first end, a second end, and a bottom edge. Means is provided at the first end for pivotally mounting the support frame to a ground opener. A ground closer plate is secured to the bottom edge of the support frame at the second end. A rod is pivotally mounted to the second end of the support frame. A receptacle is provided for attachment to a seed/fertilizer delivery tube. Means is provided to detachably secure the rod within the receptacle at one of a plurality of attachment positions along the length of the rod.

Although beneficial results may be obtained through the use of the ground closer kit, as described above, it is preferred that a first link of a multi-link chain be secured to a top surface of the ground closer plate.

According to another aspect of the present invention there is provided a method of adding a ground closer plate to a seeding/fertilizing apparatus. This method consists of a series of steps. Firstly, providing a seeding/fertilizing apparatus that includes a ground opener having a leading edge, a trailing edge, means for mounting the ground opener to an agricultural implement, and a seed/fertilizer delivery tube disposed along the trailing edge of the ground opener. Secondly, pivotally mounting a first end of a support frame to the ground opener. A ground closer plate is secured to a bottom edge of the support frame at a second end. Thirdly, pivotally mounting a first end of a rod to the second end of the support frame. Fourthly, securing a receptacle to the seed/fertilizer delivery tube. Means is provided for detachably securing the rod within the receptacle at one of a plurality of attachment positions along the length of the rod, such that by selecting an attachment position along the length of the rod, the support frame is pivoted to provide a desired angular relationship between the trailing edge of the ground opener and the ground closer plate.

The method, as described above, sets forth the steps involved in attaching the ground closer kit to a seeding/fertilizing apparatus.

According to another aspect of the present invention there is provided a seeding/fertilizing apparatus having a ground closer plate. The seeding/fertilizing apparatus includes a ground opener having a leading edge, a trailing edge, and means for mounting the ground opener to an agricultural implement. A seed/fertilizer delivery tube is disposed along the trailing edge of the ground opener. A support frame is provided having a first end, a second end, and a bottom edge. The first end is pivotally mounted to the ground opener. A ground closer plate is secured to the bottom edge of the support frame at the second end. A rod is pivotally mounted to the second end of the support frame. Means is provided for detachably securing the rod to the seed/fertilizer delivery tube. Means is also provided for engaging the rod at one of a plurality of attachment positions along the length of the rod, such that by selecting an attachment position along the length of the rod, the support frame is pivoted to provide a desired angular relationship between the trailing edge of the ground opener and the ground closer plate.

The angular adjustability feature which enables the above described ground closer kit to be adapted to suit seeding/fertilizing apparatus with different styles of ground opener, continues to play a valuable role after installation. The desired angle of the ground closer plate varies with the depth, moisture content, and grade of soil.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
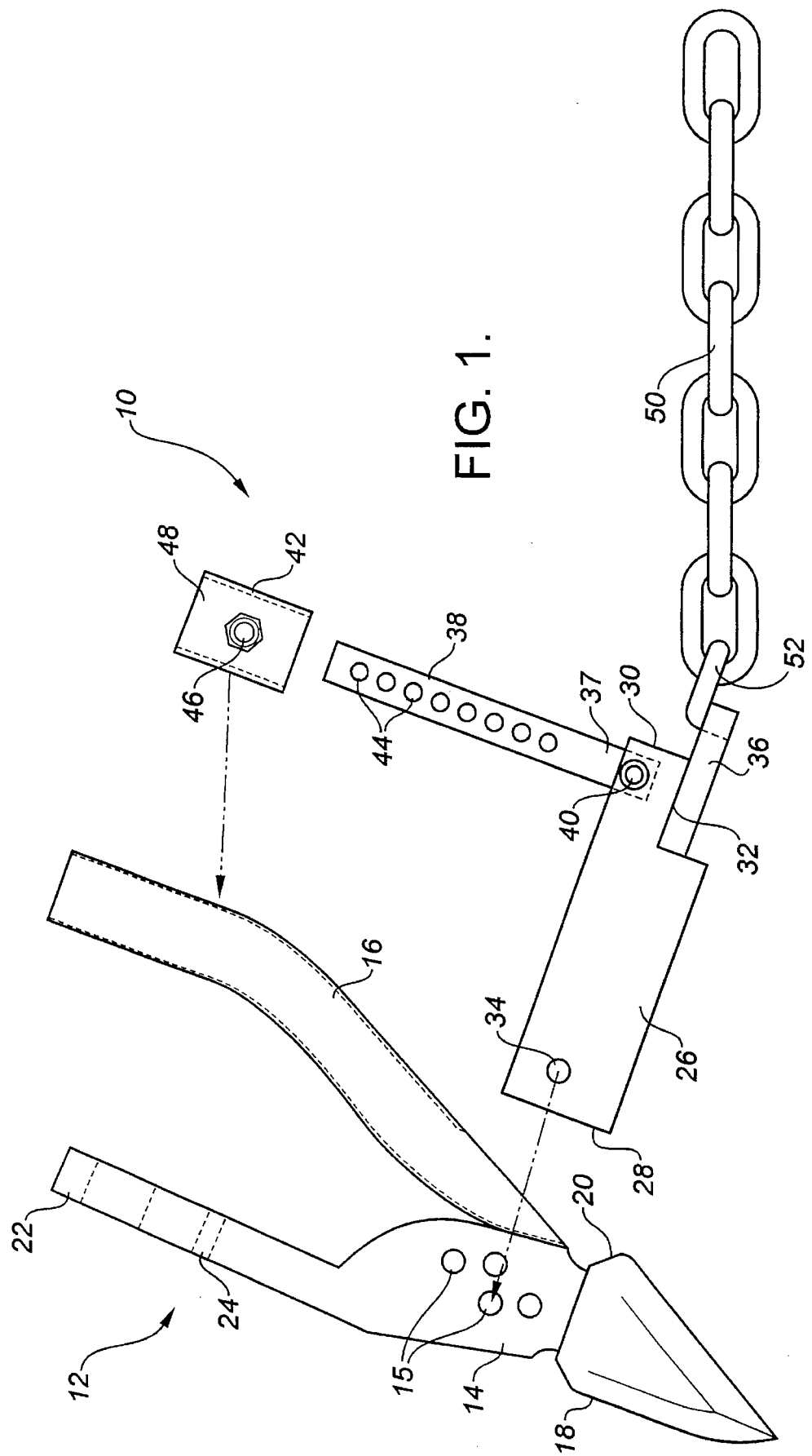
FIG. 1 is an exploded side elevation view of a seeding/fertilizing apparatus together with a ground closer kit constructed in accordance with the teachings of the present invention.

The preferred embodiment, a ground closer kit generally identified by reference numeral 10, will now be described with reference to FIGS. 1 through 3.

Ground closer kit 10 was developed for attachment to a prior art seeding/fertilizing apparatus 12. Referring to FIG. 1, prior art seeding/fertilizing apparatus 12 includes a ground opener 14 and a seed/fertilizer delivery tube 16. Ground opener 14 has a leading edge 18 and a trailing edge 20. Ground opener 14 includes a mounting portion 22 with apertures 24, by means of which ground opener 14 is mounted to an agricultural implement (not shown). Seed/fertilizer delivery tube 16 is disposed along trailing edge 20 of ground opener 14.

Referring to FIG. 1, ground closer kit 10 includes a support frame 26 having a first end 28, a second end 30, and a bottom edge 32. Referring to FIG. 3, support frame 26 has two parallel members 27 with a space 29 inbetween. Apertures 34 are provided at first end 28 of support frame 26, by means of which support frame 26 is pivotally mounted to ground opener 14, as will hereinafter be further described. A ground closer plate 36 is secured to bottom edge 32 at second end 30 of support frame 26. One end 37 of rod 38 is pivotally mounted by means of a fastener 40 to second end 30 of support frame 26. A receptacle 42 is provided for attachment to seed/fertilizer delivery tube 16, as will hereinafter be further described. It is preferred that rod 38 have a plurality of indentations 44 along its length which represent a plurality of attachment positions. A set screw 46 is threaded into a nut 47 that is welded over an aperture (not shown) that extends through a sidewall 48 of receptacle 42. Nut 47 serves as a threading mechanism for set screw 46. Set screw 46 is used as means for detachably secure rod 38 within receptacle 42. Set screw 46 can be threaded through sidewall 48 of receptacle 42 to engage one of the plurality of indentations 44, thereby fixing rod 38 in a selected attachment position within receptacle 42. It is preferred that ground closer kit 10 include a multi-link chain 50. A first link 52 of multi-link chain 50 is secured to a top surface 51 of ground closer plate 36. It is secured to top surface 51 in order to ensure it does not interfere with the packing function of ground closer plate 36, as will hereinafter be further explained.

Figure 2:
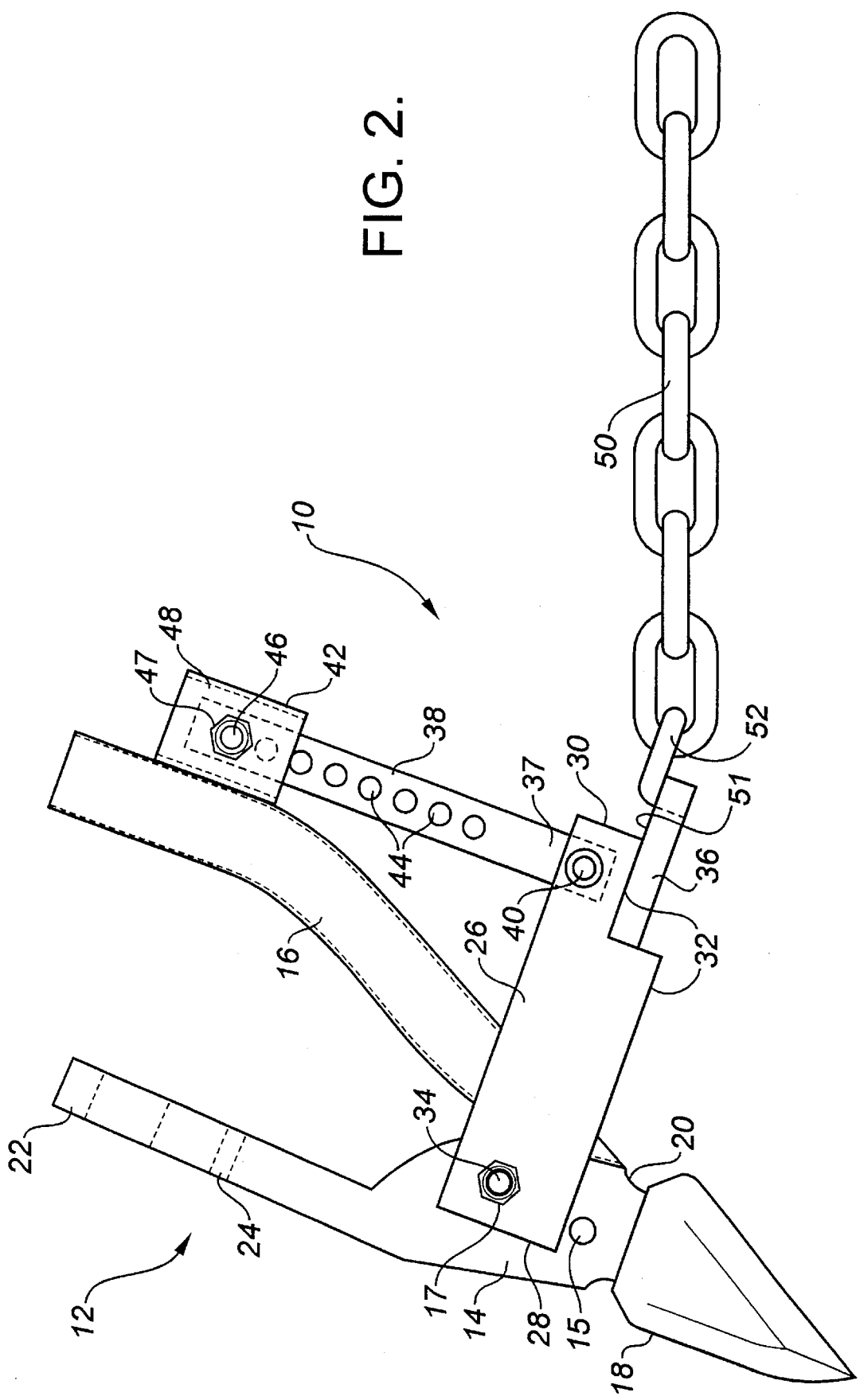
FIG. 2 is a side elevation view of a seeding/fertilizing apparatus with a ground closer plate constructed in accordance with the teachings of the present invention.
Figure 3:
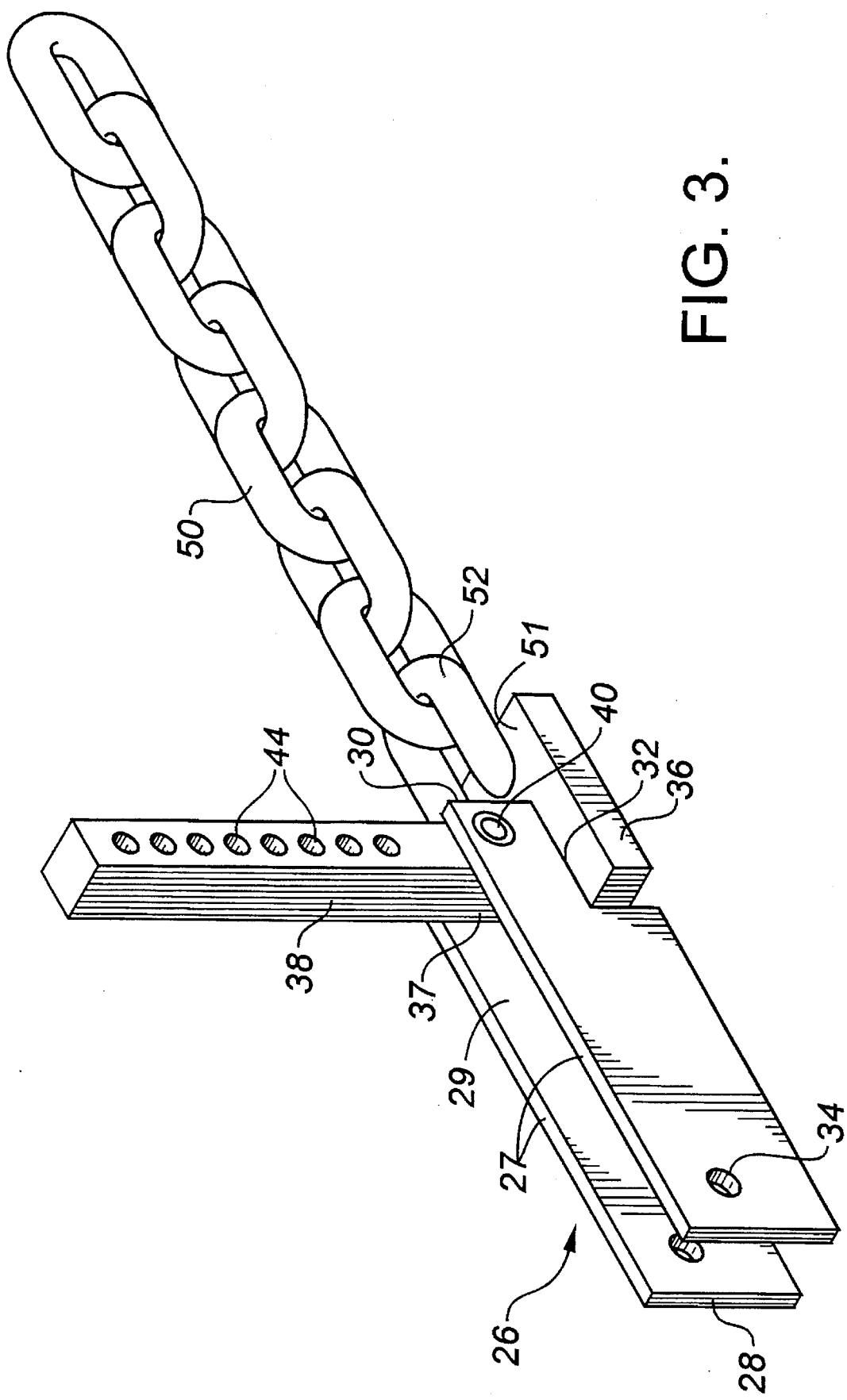
FIG. 3 is a detailed perspective view of the support frame portion of the ground closer kit.

Referring to FIG. 2, in order to install ground closer kit 10 on prior art seeding/fertilizing apparatus 12, the following steps are taken. Firstly, provide seeding/fertilizing apparatus 12, as previously described. Secondly, pivotally mount first end 28 of support frame 26 to ground opener 14. In order to do this at least one hole 15 is provided through ground opener 14. Support frame 26 can then be pivotally mounted to ground opener 14 by extending a bolt 17 through apertures 34 at first end 28 of support frame 26 and through hole 15. It is preferred that there be a plurality of holes 15, providing a number of alternate mounting positions, this allows for changes in the angle of support frame 26 which can be important for reasons that will hereinafter be further described. Thirdly, pivotally mount end 37 of rod 38 to second end 30 of support frame 26. Fourthly, secure receptacle 42 to seed/fertilizer delivery tube 16. The preferred manner of securing receptacle 42 to seed/fertilizer delivery tube 16 is by welding, although an attachment bracket may be used. Rod 38 slides into receptacle 42 and is secured in position by screwing set screw 46 into engagement with one of the plurality of indentations 44 that represent attachment positions. The attachment position along the length of rod 38 determines the pivotal position of support frame 26 which, in turn, determines a desired angular relationship between trailing edge 20 of ground opener 14 and ground closer plate 36.

The use and operation of seeding/fertilizing apparatus 12 as modified by ground closer kit 10 will now be described with reference to FIGS. 1 and 2. As seeding/fertilizing apparatus 10 is pulled by an agricultural implement (not shown), leading edge 18 of ground opener 14 opens a furrow. It is important to note that when pivotally mounted, as described, seed/fertilizer delivery tube 16 is positioned in space 29 between two parallel members 27 of support frame 26. Support frame 26 serves as a protective shroud that prevents the sides of the furrow from collapsing until seed or fertilizer has passed through seed/fertilizer delivery tube 16 and fallen through space 29 into the furrow. It also prevents soil from plugging seed/fertilizer delivery conduit 16. Ground closer plate 36, passes along at second end 30 of support frame 26 directing soil into the furrow. Ground closer plate 36 functions as a packer. However, in some types of soil conditions it should not be used alone. For example, in wet gumbo soil ground closer plate 36 does such a good job of packing that there is a danger the packed surface will become baked by the sun. For this reason, it is preferred that subsurface chain 50 be dragged behind ground closer plate 36. Chain 50 serves to mix soil and ground cover. This forms a porous cover layer that rain can infiltrate and avoids crusting.

It was previous mentioned that it was preferred that a plurality of mounting holes 15 be provided in ground closer 14. The reason for this is that it is difficult to control the angle of attack of ground closer plate 36 solely by raising or lowering second end 30. For example, when working in wet gumbo soil the preferred method of attack is at an extremely shallow angle to create a trowelling effect. Even if a change is not required to address changing soil and moisture conditions, periodic adjustment is required as leading edge 18 of ground opener 14 wears. Wear of leading edge 18 over time can significantly alter the angles and inter-relationship with ground closer plate 36.

It will be apparent to one skilled in the art that modifications may be made to the illustrated embodiment without departing from the spirit and scope of the invention as hereinafter defined in the claims.

The Embodiments of the Invention in which an exclusive property or privilege is claimed are defined as follows:

1. A ground closer kit for attachment to a ground opening apparatus having a delivery tube, comprising:

a support frame having a first end, a second end, and a bottom edge, means being provided at the first end for pivotally mounting the support frame to a ground opener, a ground closer plate being secured to the bottom edge of the support frame at the second end;

a rod pivotally mounted to the second end of the support frame; and a receptacle attachable to a delivery tube, means being provided to detachably secure the rod within the receptacle at one of a plurality of attachment positions along the length of the rod.

2. The kit as defined in claim 1, wherein a first link of a multi-link chain is secured to a top surface of the ground closer plate.

3. A method of adding a ground closer plate to a ground opening apparatus having a delivery tube, comprising the steps of:

providing a ground opener having a leading edge, a trailing edge, means for mounting the ground opener to an agricultural implement, and a delivery tube disposed along the trailing edge of the ground opener;

pivotally mounting a first end of a support frame to the ground opener, a ground closer plate being secured to a bottom edge of the support frame at a second end;

pivotally mounting a first end of a rod to the second end of the support frame, and securing a receptacle to the delivery tube, means being provided for detachably securing the red within the receptacle at one of a plurality of attachment positions along the length of the rod, such that by selecting an attachment position along the length of the rod, the support frame is pivoted to provide a desired angular relationship between the trailing edge of the ground opener and the ground closer plate.

4. A ground opening apparatus having a delivery tube and ground closer plate, comprising:

a ground opener having a leading edge, a trailing edge, and means for mounting the ground opener to an agricultural implement;

a delivery tube disposed along the trailing edge of the ground opener;

a support frame having a first end, a second end, and a bottom edge, the first end being pivotally mounted to the ground opener;

a ground closer plate secured to the bottom edge of the support frame at the second end;

a rod pivotally mounted to the second end of the support frame; and means for detachably securing the rod to the delivery tube, including means for engaging the rod at one of a plurality of attachment positions along the length of the rod such that by selecting an attachment position along the length of the rod, the support frame is pivoted to provide a desired angular relationship between the trailing edge of the ground opener and the ground closer plate.

5. The ground opening apparatus as defined in claim 4, wherein a first link of a multi-link chain is secured to a top surface of the ground closer plate.

* * * * *